(12) United States Patent
Davison et al.

(10) Patent No.: US 12,042,910 B2
(45) Date of Patent: *Jul. 23, 2024

(54) APPARATUS FOR ASSISTED BUCKLE RELEASE

(71) Applicant: B & B Solutions, LLC, Houston, TX (US)

(72) Inventors: Rebecca Davison, Houston, TX (US); Barbara Heilman, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 18/308,181

(22) Filed: Apr. 27, 2023

(65) Prior Publication Data

US 2023/0347483 A1 Nov. 2, 2023

Related U.S. Application Data

(63) Continuation of application No. 17/969,158, filed on Oct. 19, 2022, now Pat. No. 11,745,321, which is a continuation of application No. 17/696,987, filed on Mar. 17, 2022, now Pat. No. 11,498,192, which is a continuation of application No. 17/237,231, filed on Apr. 22, 2021, now Pat. No. 11,389,938, which is a continuation-in-part of application No. 16/675,305, filed on Nov. 6, 2019, now Pat. No. 10,994,396, which is a continuation-in-part of application No. 16/278,021, filed on Feb. 15, 2019, now Pat. No. 10,500,702, which is a continuation of application No. 15/699,198, filed on Sep. 8, 2017, now Pat. No. 10,213,910.

(60) Provisional application No. 62/394,080, filed on Sep. 13, 2016.

(51) Int. Cl.
*B25B 27/00* (2006.01)
*A44B 11/25* (2006.01)
*B25G 1/10* (2006.01)
*B60N 2/28* (2006.01)
*B60R 22/10* (2006.01)

(52) U.S. Cl.
CPC ...... *B25B 27/0035* (2013.01); *A44B 11/2546* (2013.01); *B25G 1/102* (2013.01); *B60N 2/2812* (2013.01); *B60N 2002/2815* (2013.01); *B60R 22/105* (2013.01)

(58) Field of Classification Search
CPC . B25B 27/0035; A44B 11/2546; B25G 1/102; B60N 2/2812; B60N 2002/2815; B60R 22/105
USPC .......................................................... 81/15.9
See application file for complete search history.

(56) References Cited

U.S. PATENT DOCUMENTS

| 5,282,737 A * | 2/1994 | Ray | F23Q 25/00 294/99.2 |
|---|---|---|---|
| 10,791,801 B2 * | 10/2020 | Lambarth | B25B 27/0035 |
| 11,678,726 B2 * | 6/2023 | Riley-Carter | A44B 11/2549 24/633 |
| 2011/0308057 A1 * | 12/2011 | Abrams | B25B 7/02 29/270 |
| 2016/0166014 A1 * | 6/2016 | Soenen | A44B 11/2526 24/639 |

(Continued)

*Primary Examiner* — Hadi Shakeri
(74) *Attorney, Agent, or Firm* — WILLIAMS INTELLECTUAL PROPERTY (57) ABSTRACT

An apparatus for assisted buckle release employing a generally C-shaped, V-shaped, or U-shaped assistive device adapted to depress a buckle's release button, such as a button typical of a child car seat restraint harness, and thereby assist in unlocking the buckle.

9 Claims, 8 Drawing Sheets

(56) References Cited

U.S. PATENT DOCUMENTS

2017/0209150 A1\* 7/2017 Shelton, IV ......... A61B 17/122
2018/0116344 A1\* 5/2018 Riley-Carter ...... A44B 11/2549
2018/0132571 A1\* 5/2018 Lambarth .......... A44B 11/2526

\* cited by examiner

APPARATUS FOR ASSISTED BUCKLE RELEASE

CROSS-REFERENCE TO RELATED APPLICATIONS

This continuing application claims the benefit of continuing application Ser. No. 17/969,158 filed on 19 Oct. 2022 which in turn claims the benefit of continuing application, Ser. No. 17/696,987 filed on 17 Mar. 2022, which claimed the benefit of continuing application Ser. No. 17/237,231 filed on 22 Apr. 2021, which claimed the benefit of continuation-in-part application Ser. No. 16/675,305, filed on 6 Nov. 2019, which claimed the benefit of continuation-in-part application Ser. No. 16/278,021, filed on 15 Feb. 2019, which in turn claims the benefit of nonprovisional application Ser. No. 15/699,198, filed on 8 Sep. 2017.

FEDERALLY SPONSORED RESEARCH OR DEVELOPMENT

Not Applicable

INCORPORATION BY REFERENCE OF MATERIAL SUBMITTED ON A COMPACT DISK

Not Applicable

TO ALL WHOM IT MAY CONCERN

Be it known that we, Rebecca Davison and Barbara Heilman, citizens of the United States, have invented new and useful improvements in an apparatus for assisted buckle release as described in this specification.

FIELD OF THE INVENTION

The present invention relates in general to the field of occupant restraint systems and more particularly, but not by way of limitation to an apparatus that assists with the depression of actuator buttons on restraint harnesses to facilitate release of the buckle.

BACKGROUND OF THE INVENTION

Occupant restraint systems are well known. They typically have a first piece of belting having a buckle at one end and an opposite end is anchored in place. The anchoring may be either by direct fastening or via a device such as a retractor. A tongue is attached to a free end of a second piece of belting whose opposite end is also anchored. When the restraint system is in use to restrain a seated occupant, the two pieces of belting are connected by inserting the tongue of the second piece of belting into the buckle of the first piece of belting and adjusting the restraint around the occupant.

The buckle comprises a casing which contains a spring-loaded latching mechanism for releasably latching the buckle to the tongue. A typical buckle casing comprises an aperture which exposes an actuating button for depression by a person's thumb or fingertip to cause the latching mechanism to release the buckle from the latched condition. In today's typical buckle, the area of the actuating button, which is exposed by the aperture, approximates that of the thumb or fingertip. The actuating button surface against which the thumb or fingertip presses is generally flush with the surface of the casing containing the aperture. Oftentimes, a smaller version of this same type of buckle and actuating button assembly is used in child restraint seats designed to secure an occupant, such as a baby or child, in place. The actuating button assembly installed in child restraint seats is regulated by the Federal Motor Vehicle Safety Standards (FMVSS), which recommends a minimum required release force to depress the actuating button of 40 N (Newton) or 9.0 lbf (pound-force).

For any number of various reasons, a person may be impaired from depressing the actuating button with this amount of force and, thus, unable to unlatch a child restraint seat buckle of this type. For instance, caregivers may have arthritis in their hands, which impacts the strength with which they can apply pressure in their thumbs to sufficiently depress the actuator button with the required force to release the buckle and remove the child from the car seat. With the increase in the number of grandparent caregivers, the lack of required thumb or finger strength presents a significant problem for the convenience of mobility in an automotive vehicle while caring for a young child. Further, the situation poses risks to child safety if the caregiver does not properly buckle the child to thereby make it easier for the caregiver to release the buckle when necessary. In addition to arthritis, other circumstances may arise where caregivers lack sufficient hand strength, including carpel tunnel syndrome, tendonitis, and chronic or temporary conditions or injuries.

The existing prior art in U.S. Pat. No. 8,539,862, which is incorporated herein by reference, seeks to address many of the foregoing difficulties. However, for those with arthritis in their hands and fingers, gripping edges of the housing element is difficult or painful, resulting in an inadequate ability to exert the required pressure to release the buckle. Additionally, the prior art lacks a backing to support the intended use, resulting in the need to position a free hand without guidance, or to push hard against the occupant of the car seat and apply uncomfortable pressure. The prior art offers no method for reducing or otherwise alleviating the amount of force required by the user to release the buckle.

Other attempts at addressing the difficulties described above include the use of pliers to depress the button and release the buckle from the latched condition. For example, a pair of standard pliers may be modified to have a protrusion on an end thereof to allow the protrusion to press the release button when the pliers are closed. However, this solution does not address the difficulty experienced by users with arthritis and other hand ailments. Oftentimes, users with arthritis have a difficult time using scissors or pliers due to the manual dexterity required. Therefore, a solution is needed that allows the button to be depressed in a method that requires minimal thumb or finger strength.

In another prior art attempt to address the difficulties described above, a lever arm is attached to the seat belt below the buckle. The lever arm has a protrusion thereon so that when force is applied to an opposite end of the lever, the protrusion depresses the button. While this solution allows pressure to be applied using the palm of the hand, rather than relying on individual finger strength, it requires a user to apply pressure straight into the buckle. This is often difficult to accomplish because the parent or guardian is normally reaching in from the side of the car seat when trying to unbuckle the occupant. One additional drawback of this type of lever arm is that it requires the device to be affixed to the strap of the car seat as a source of leverage, which poses a safety risk if a child learns to use the device to release the latch, but lacks the maturity to know when it is safe to do so.

By remaining affixed to the car seat, the device has the potential to enable a child to release the latch while the car is in motion.

SUMMARY OF THE INVENTION

The buckle release assistive device of the present invention seeks to overcome the prior art by addressing these considerations with a unique design that was developed by an occupational therapist specializing in hand therapy with expertise in designing rehabilitative solutions for activities required in daily life. Unique features of the design, which distinguish it from the prior art, may include, among other features, the use of a lever arm to reduce pressure required to push the device, no longer requiring dependency on the fingers for gripping the buckle, and the ability to use the device from a side of the occupant for expedient release of the buckle and emergent removal of the occupant from under the restraints.

The present apparatus for assisted buckle release has been devised to provide facility in depressing the actuator button of a car seat restraint harness to expediently effect release of the buckle from its locking engagement of the car seat restraint harness in a less painful and more convenient manner than through pressing the actuator button directly. The present method is applicable to a variety of automotive vehicle occupant restraint systems including, but not limited to, child car seat restraint systems.

It is another objective of the present method to alleviate hand or finger pain caused by repetitive motion in depressing the pre-existing actuator button of vehicle occupant restraint systems including, but not limited to, child car seat restraint systems.

Yet another objective of the present method is to provide a useful and safe means for individuals with chronic hand pain or limited hand function to use a standard vehicle occupant restraint systems including, but not limited to, child car seat restraint systems.

The present apparatus and method for assisted buckle release, therefore, employs use of a buckle release assistive device which is specifically adapted to facilitate depression of the buckle release button devised to release the restraining belts interconnected therewith. As outlined above, many car restraints operable upon car seats, for example, employ a buckle connection that is releasable via depression of an out-facing button disposed thereupon.

The present apparatus increases the facility of disconnecting the restraints by action of a lever arm dispose projected arcuately from an engagement portion adapted to engage against the buckle an/or restraint webbing of a vehicle occupant restraint system. The lever arm increases torque an pressure applicable to the restraint button placed in contact with a protuberance projected from a basal surface of the lever arm. Purchase is provided against which to effectuate leverage by engagement of the engagement portion in contact with the buckle an/or restraints whereby the protuberance is leverageable to depress the button when the lever arm is pushed toward the buckle. Depressing the release button, and releasing the restraints from the buckle, is therefore rendered easier for the user, due to the increased torque and pressure applied through the protuberance to effectuate depression of the button and removal of the restrains may be effectuated more quickly. This, therefore, facilitates release of the restraints with less force and discomfort required of the user.

The aforementioned broadly outlines the more important features of the present apparatus for assisted buckle release, where the detailed description thereof that follows may be better understood and in order that the present contribution to the art may be better appreciated.

Other objectives and advantages of the present apparatus for assisted buckle release will become apparent to those skilled in the art as a more detailed explanation of a the invention is presented below. The drawings disclose a buckle release assistive device, according to one possible embodiment, devised for employing the present method of assisted buckle release. The above summary of the invention is not intended to represent each embodiment or every aspect of the present invention. Particular embodiments may include one, some, or none of the listed advantages.

BRIEF DESCRIPTION OF THE DRAWINGS

FIGS

A more complete understanding of the method and apparatus of the present invention may be obtained by reference to the following Detailed Description when taken in conjunction with the accompanying Drawings wherein.

DETAILED DESCRIPTION OF THE DRAWINGS

Figure 1:
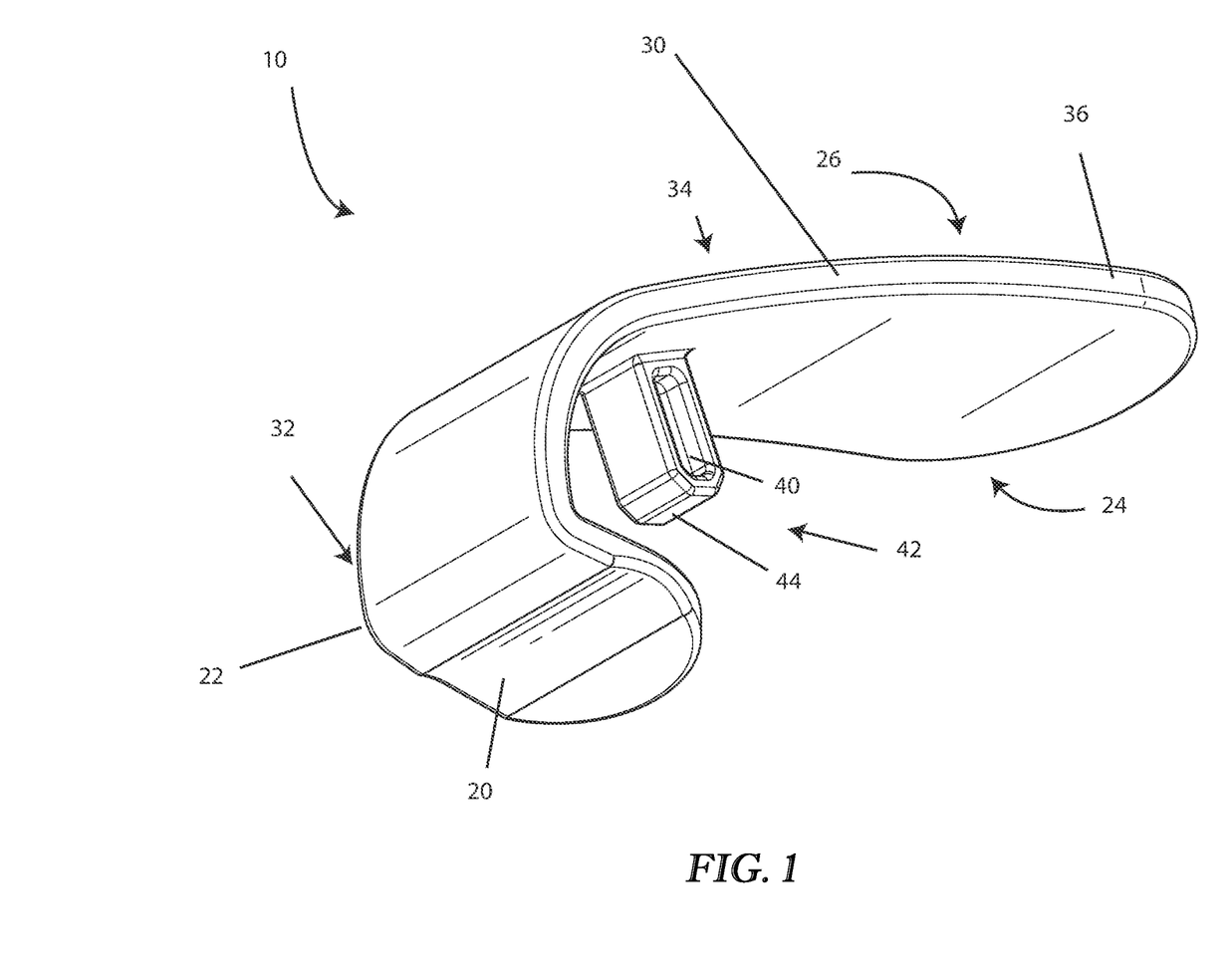
FIG. 1 is a perspective view of a buckle release assistive device according to an example embodiment of the present invention.

Referring to FIG. 1, the apparatus 10 includes an engagement portion 20 and a generally planar or spatulate lever arm 30 connected at a midportion 22. The engagement portion 20 is devised for contact engagement upon a rear side of a restraint buckle housing 70, or in contact with a restraint directly (for example the crotch harness webbing 73), against which a user may leverage torque by manually compressing the lever arm 30 connected therewith. This increased torque applies pressure to the buckle release button 72 and facilitates opening of the buckle.

The midportion 22 is connected endwise and oriented transversely relative to the engagement portion 20. The lever arm 30 is connected endwise to the midportion 22 at a first end 32 and then spans a body portion 34 away from the engagement portion 20. In at least one example embodiment contemplated herein, the body portion 34 is angularly projected from the midportion 22, at an acute angle relative to the engagement portion 20. In at least one example embodiment contemplated herein, the body portion 34 is spanned along an arced expanse terminating at a second end 36 disposed at a farthermost extremity of the lever arm 30.

A protuberance 40 is projected from a basal side 24 of the lever arm 30, in a position more proximal the first end 32 of the lever arm 30 and positioned to overlie the release button 72 of a restraint buckle 70 when the engagement portion 20 is positioned in contact with said restraint buckle 70. A user may therefore depress the lever arm 30 and force the protuberance 40 to contact and depress the release button 72 with relative ease. Torque applied by the lever arm 30 distance relative to the protuberance 40 assists in depressing the button 72 and effectuating release of the restraints.

Figure 2:
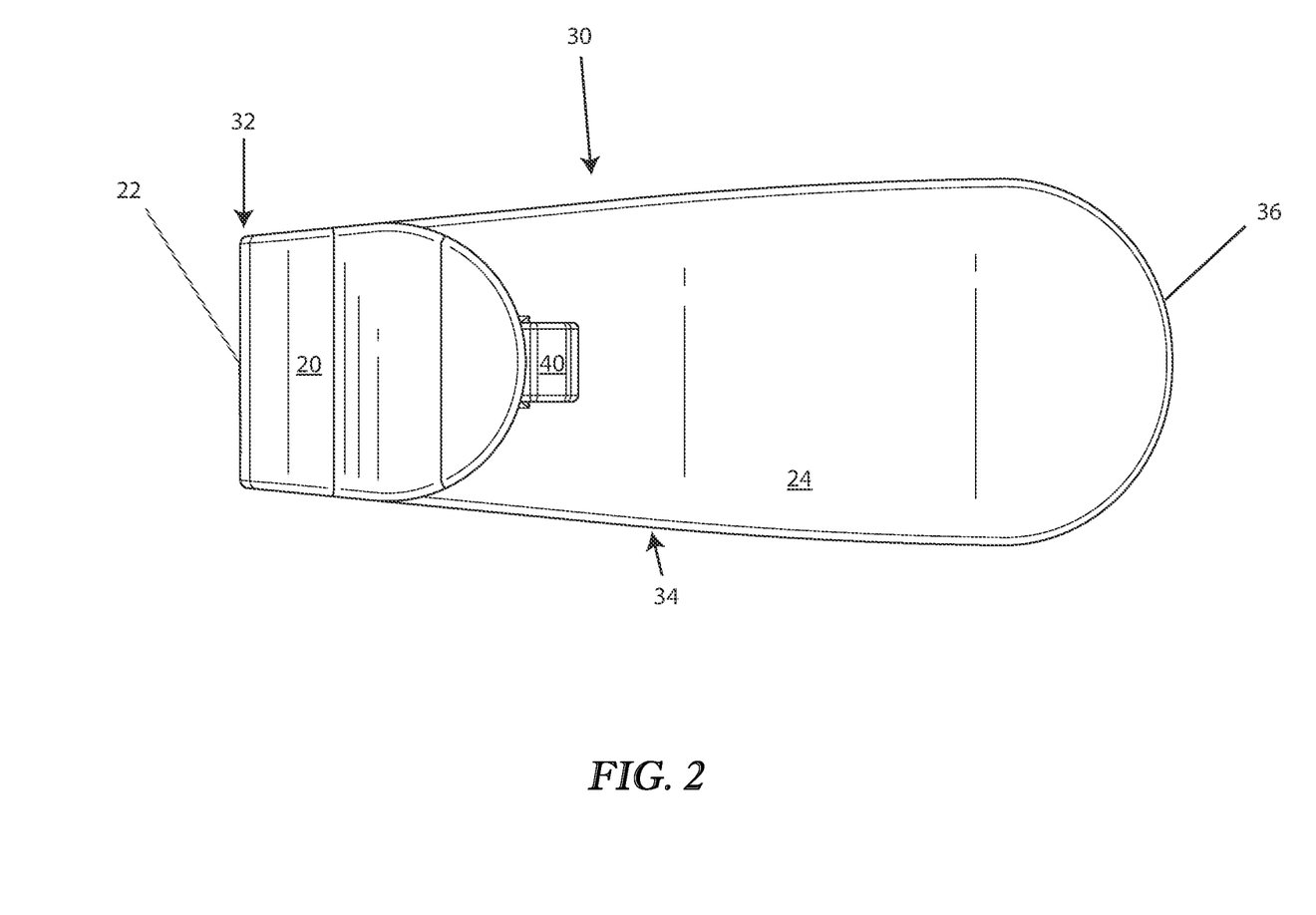
FIG. 2 is a basal elevation view of an example embodiment of the buckle release assistive device.
Figure 5:
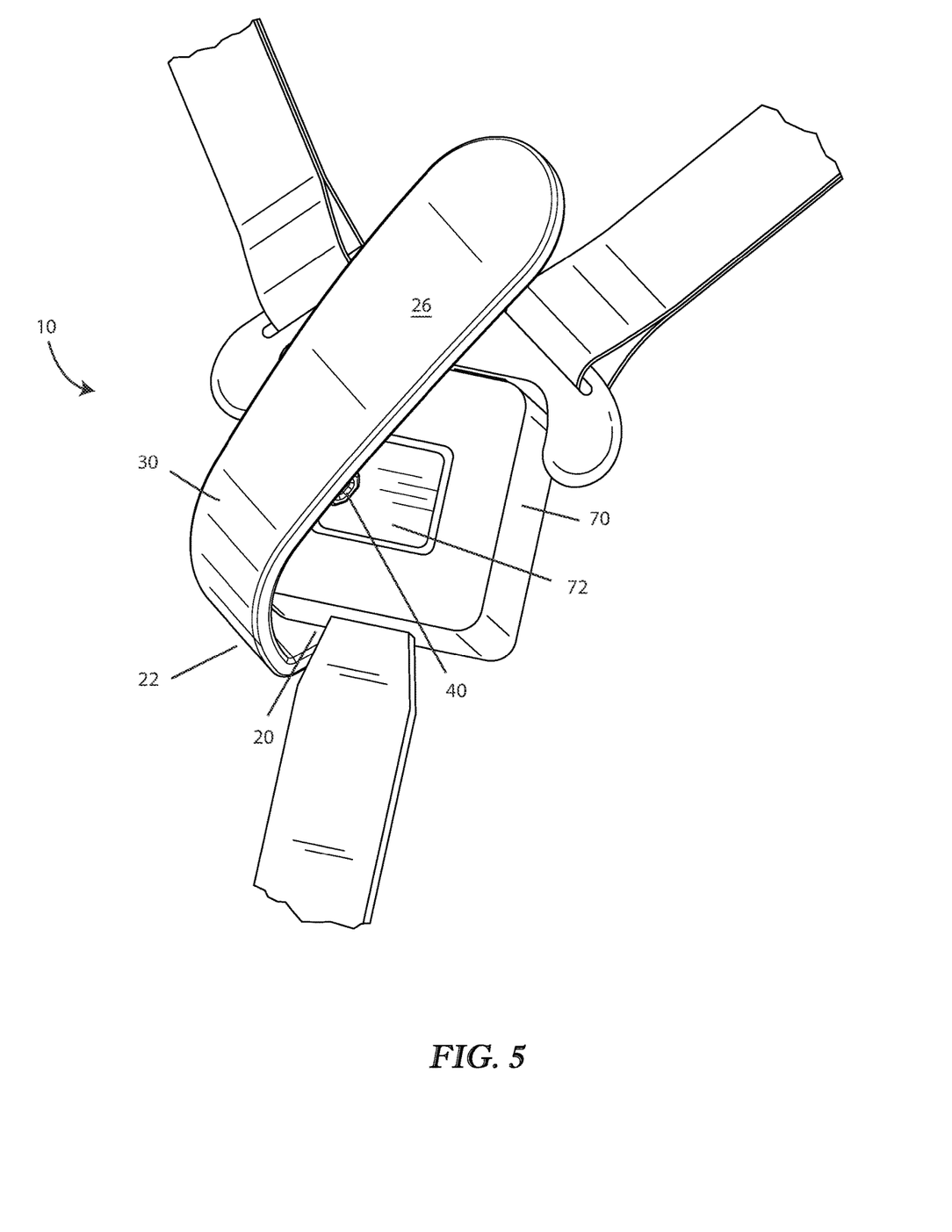
FIG. 5 is an in-use view of an example embodiment of the buckle release assistive with an engagement portion disposed against the rear side of a buckle housing to leverage thereagainst in actioning a lever arm to effectuate depression of a release button.
Figure 8:
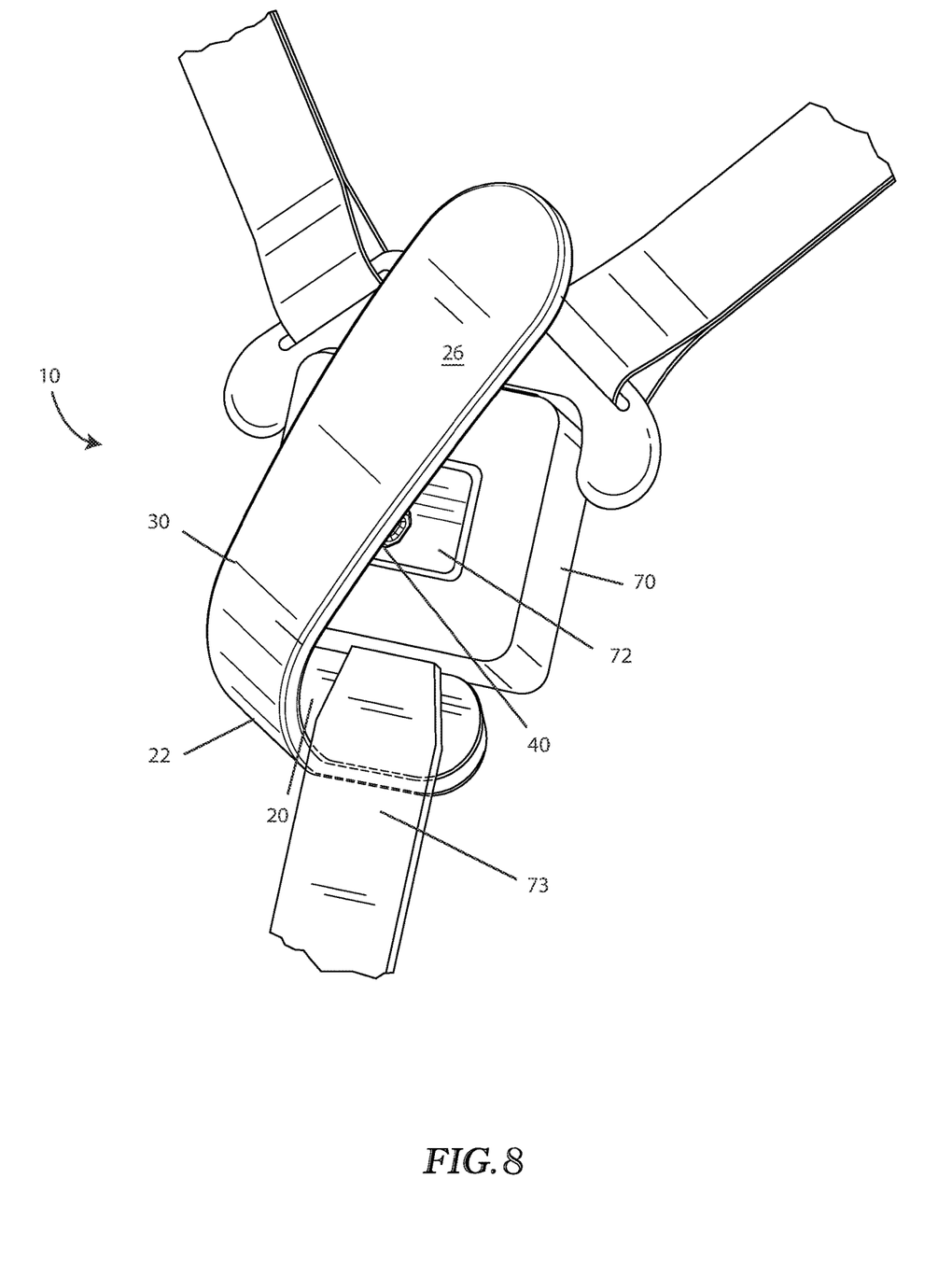
FIG. 8 is in-use elevation view of an example embodiment of the buckle release assistive device with the engagement portion engaged against the crotch harness webbing of the restraint harness illustrating rotation of the lever arm into a position overtop the release button.

FIG. 2 illustrates an elevation view of a basal side 24 of the apparatus 10. The engagement portion 20 is fittable against the rear side of a restraint buckle 70 such that the buckle 70 is then accommodated on three sides by the apparatus 10 (as shown in FIG. 5). The engagement portion 20 is also fittable against the restraint directly, for example, against the crotch harness webbing 73, in like manner to leverage torque (as shown in FIG. 8). The midportion 22 between the engagement portion 20 and the lever arm 30 accommodates depression of the lever arm 30 to effectuate contact of the protuberance 40 against the release button 72, to compress the button 72 and effectuate release of the button 72. It should be noted that positioning the engagement portion 20 against the rear side of a buckle 72 of a restraint (or elsewhere upon the restraint) typically orients the protuberance 40 in the correct position overtop the release button 72.

Figure 3:
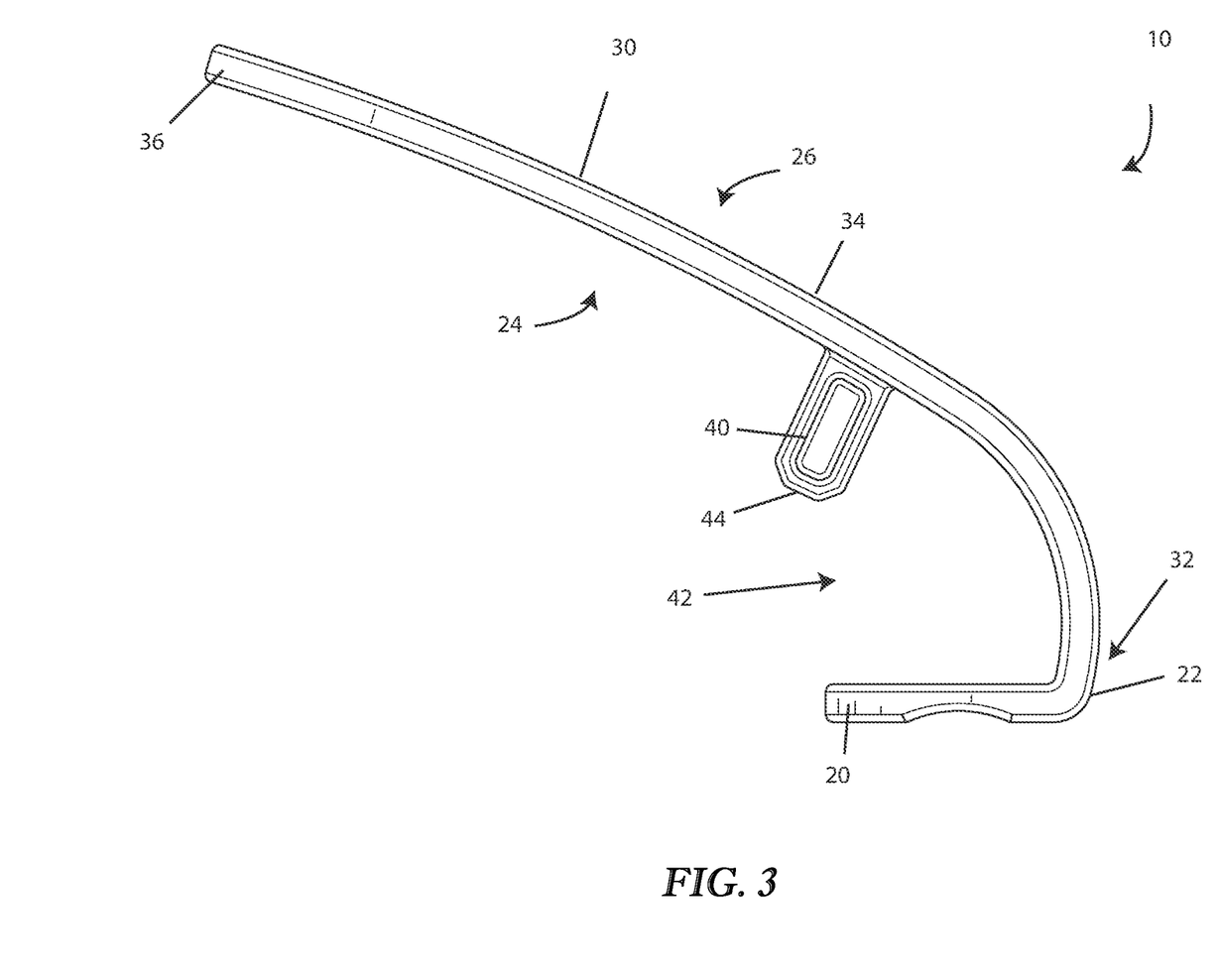
FIG. 3 is a side elevation view of an example embodiment of the buckle release assistive device.
Figure 4:
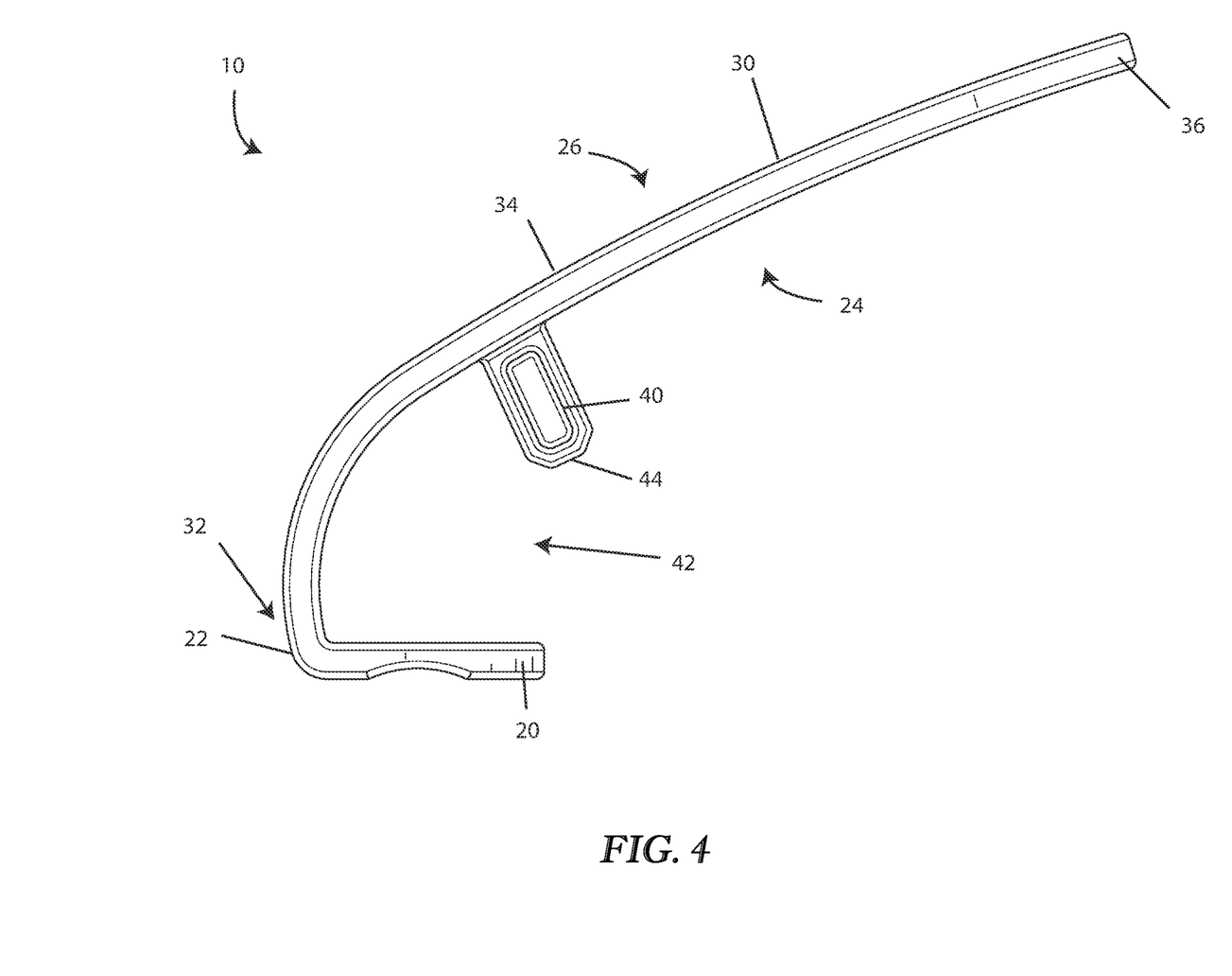
FIG. 4 is a side elevation view of an example embodiment of the buckle release assistive device.

FIGS. 3 and 4 illustrate complementary side elevation views of the apparatus 10. In the example embodiment depicted, the acute angle between the lever arm 30 and the engagement portion 20 can be seen. Engagement portion 20 and lever arm 30 therefore create an interstitial space 42 for receipt of, and engagement around, the buckle 70 to which the apparatus 10 is fit. Protuberance 40 is shown on the basal side 24 of the lever arm 30, at a position more proximal to the engagement portion 20, to increase torque as applied when the second end 36 of the lever arm 30 is manually engaged by pushing against the dorsal side 26, for example, to force the lever arm 30 toward the buckle 70 around which the apparatus 10 is engaged. It should be noted, however, that the position of the protuberance 40 upon the basal side 24 of the lever arm 30 is not intended to be limiting; the protuberance 40 may be represented anywhere along the span of the lever arm 30 that is considered as useful in facilitating the utility for which the apparatus 10 is devised.

Protuberance 40 may include an actuator surface 44 comprising material or elements devised to increase friction in contact therewith. Similarly, the engagement portion 20 may also include material or elements upon actuator surface 44 to increase traction with the buckle 70 or restraints with which it is contacted.

Figure 6:
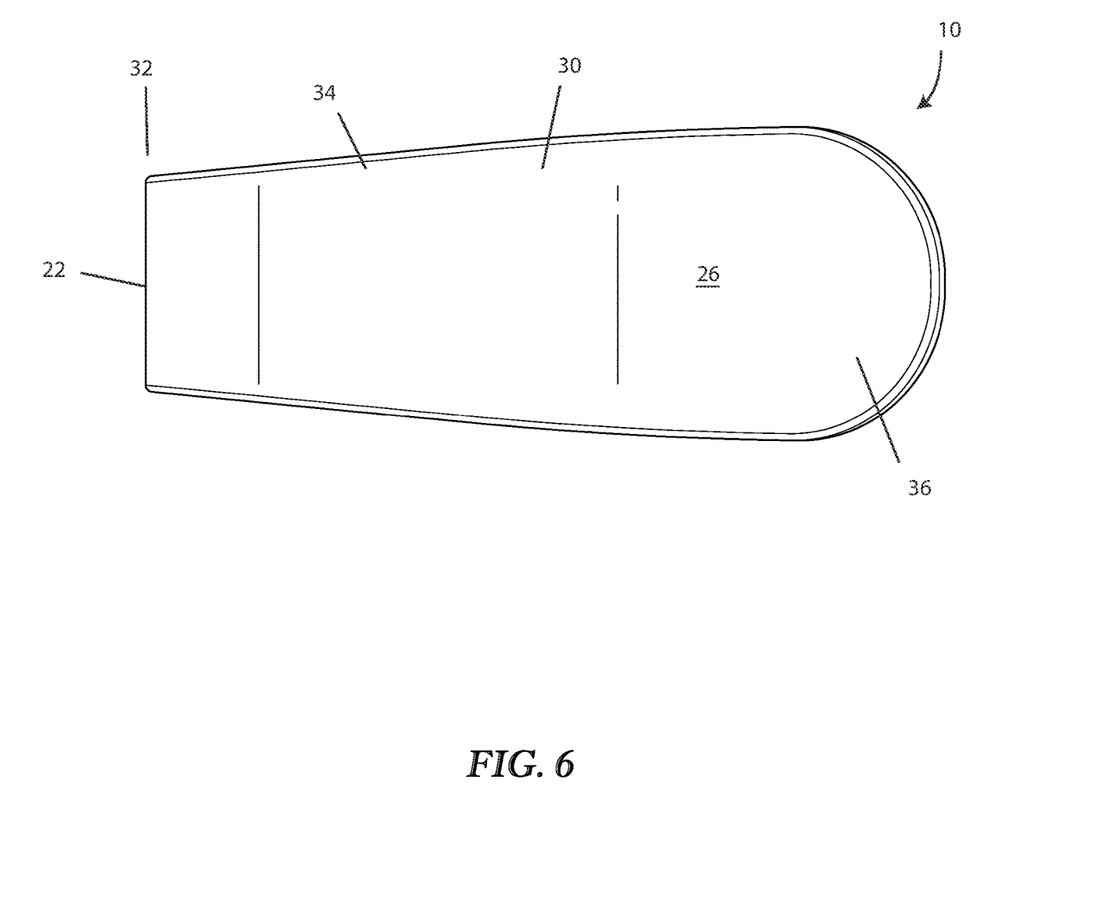
FIG. 6 is a dorsal elevation view of an example embodiment of the buckle release assistive device.

FIG. 5 illustrates an example embodiment in use, fit to a vehicular restraint buckle 70, wherein the buckle 70 is positioned into the interstitial space 42 and the engagement portion 20 is disposed on the rearward side of the buckle 70 such that the protuberance 40 is positioned over top the release button 72 and torque applied via action of the lever arm 30 facilitates depression of the release button 72 and disengagement of the restraints from the buckle housing 70.

a FIG. 6 illustrates a top elevation view of the apparatus 10, showing the dorsal side 26 of the lever arm 30. As illustrated in this example embodiment depicted, the lever arm 30 may widen toward the second end 36 to enable a greater surface area for contact with the hand of a user, whereby a user may depress the lever arm 30 by action of the palmer aspect of the hand, the thenar, or otherwise increase contact with the lever arm 30 to apply increased pressure to the protuberance 40 when actioning against the release button 72. An overmold or other polymeric, elastomeric, or other material may enclose at least the second end 36 of the lever arm 30 (as well as potentially elsewhere on the apparatus 10) to enable tractive and comfortable contact with the hands of a user as well as, in some example embodiments contemplated herein, provide ergonomic structures such as ridges, or depressions or other features accommodative of the digits, pollexes, thenars, or other parts of the human hand as may beneficially be employed to the general purpose the apparatus 10 meets.

Figure 7:
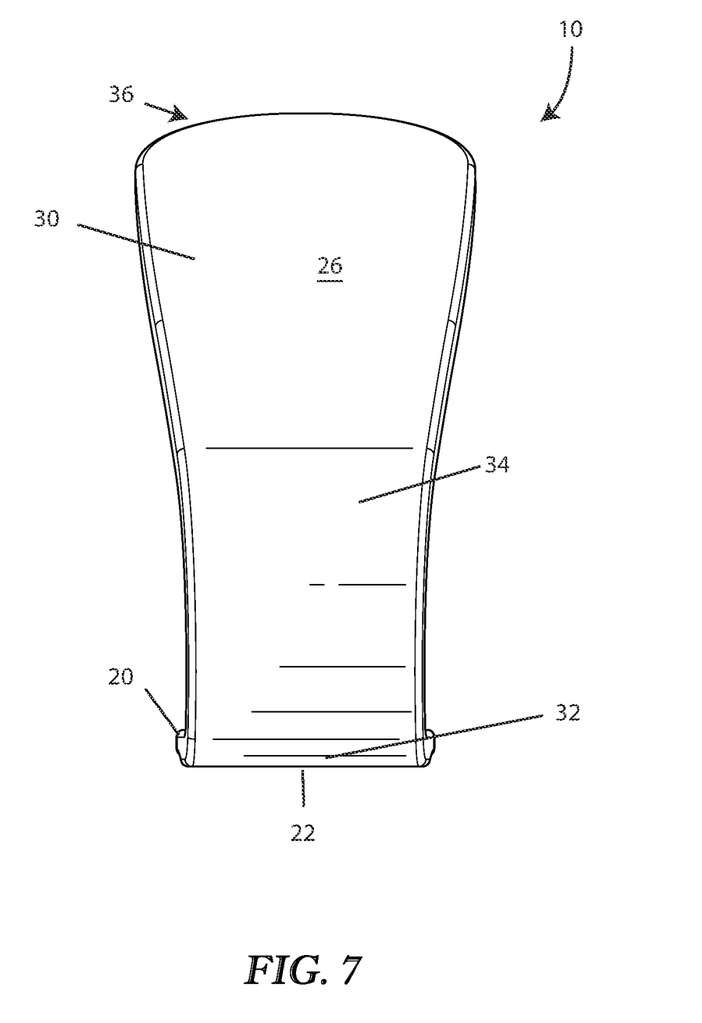
FIG. 7 is a rear elevation view of an example embodiment of the buckle release assistive device.

FIG. 7 illustrates a rear elevation view of the apparatus 10. Midportion 22 accommodates compression of the lever arm 30 towards the engagement portion 20, and, in some applications, midportion accommodates rotation of the lever arm within a coronal plane relative thereto (as shown in FIG. 8, for example), from a first, uncompressed position, to a second, compressed position, wherein the protuberance 40 on the basal side 24 of the lever arm 30 is caused to travel a minimum sufficient distance to actuate the release button 72 of the buckle 70 with which the apparatus 10 is employed.

FIG. 8 illustrates an example embodiment of the apparatus 10 in-use with the engagement portion 20 engaged in an alternative fashion, against the restraint (here, the crotch harness webbing 73) directly, rather than against the buckle housing 70 proper. The midportion 22 accommodates such situation of the apparatus 10 whereby the buckle housing 70 is fit into the interstitial space 42 while the engagement portion 20 is held rearwards of the crotch harness webbing 73, to provide leverage thereagainst. The lever arm 30 is subsequently movable to the compressed position with the protuberance 40 positioned overtop the release button 72 of the buckle housing 70 so that the protuberance 40 contacts and depresses the release button 72 to release the restraints as previously described.

What is claimed is:

1. An apparatus for assistive buckle release for facilitating the release of vehicular restraints interconnected with a buckle, said apparatus comprising:
   an engagement portion configured to be positioned against the undersurface of the buckle or restraint;
   a generally planar lever arm connected to the engagement portion, said lever arm comprising:
       a basal side;
       a dorsal side;
       a first end disposed connected to the engagement portion;
       a second end disposed projected at an extremity away from the engagement portion;
       a body section disposed from the first end to the second end; and
       a protuberance projected from the basal side of the lever arm;
   wherein the protuberance is closer to the first end than the second end;
   wherein the thickness of the lever arm at the portion that is adjacent to the protuberance is the same thickness as the second end;
   wherein the apparatus surrounds at least three sides of the buckle or restraint through at least 270° with the engagement portion in contact against an undersurface of the buckle or restraint;
   wherein the assistive device facilitates release of the restraints interconnected with the buckle by increasing torque and/or pressure at the protuberance when applied in contact with a release button.

2. The apparatus for assisted buckle release of claim 1 wherein the protuberance comprises an actuator surface configured to seat against the release button of the existing buckle.

3. The apparatus for assisted buckle release of claim 2 wherein the actuator surface is configured to increase frictional engagement against the release button of the buckle.

4. The apparatus for assisted buckle release of claim 2 wherein at least a portion of the lever arm comprises a yielding, polymeric overmold.

5. The apparatus for assisted buckle release of claim 1 wherein ends of the lever arm and engagement portion are rounded to prevent harmful contact.

6. The apparatus for assisted buckle release of claim 1 wherein the body section is disposed along an arc.

7. The apparatus for assisted buckle release of claim 1 wherein the engagement portion and the lever arm are not directly connected and are disposed on either side of a midportion.

8. The apparatus for assisted buckle release of claim 1 wherein the dorsal side of the lever arm between the location of the protuberance and the second end is flat or angular, and not curved.

9. The apparatus for assisted buckle release of claim 1 wherein the width of the protuberance is less than the width of the lever arm.

* * * * *